M. E. SMITH.
CENTRIFUGAL GOVERNOR MECHANISM.
APPLICATION FILED MAR. 24, 1919.
1,355,008.
Patented Oct. 5, 1920.
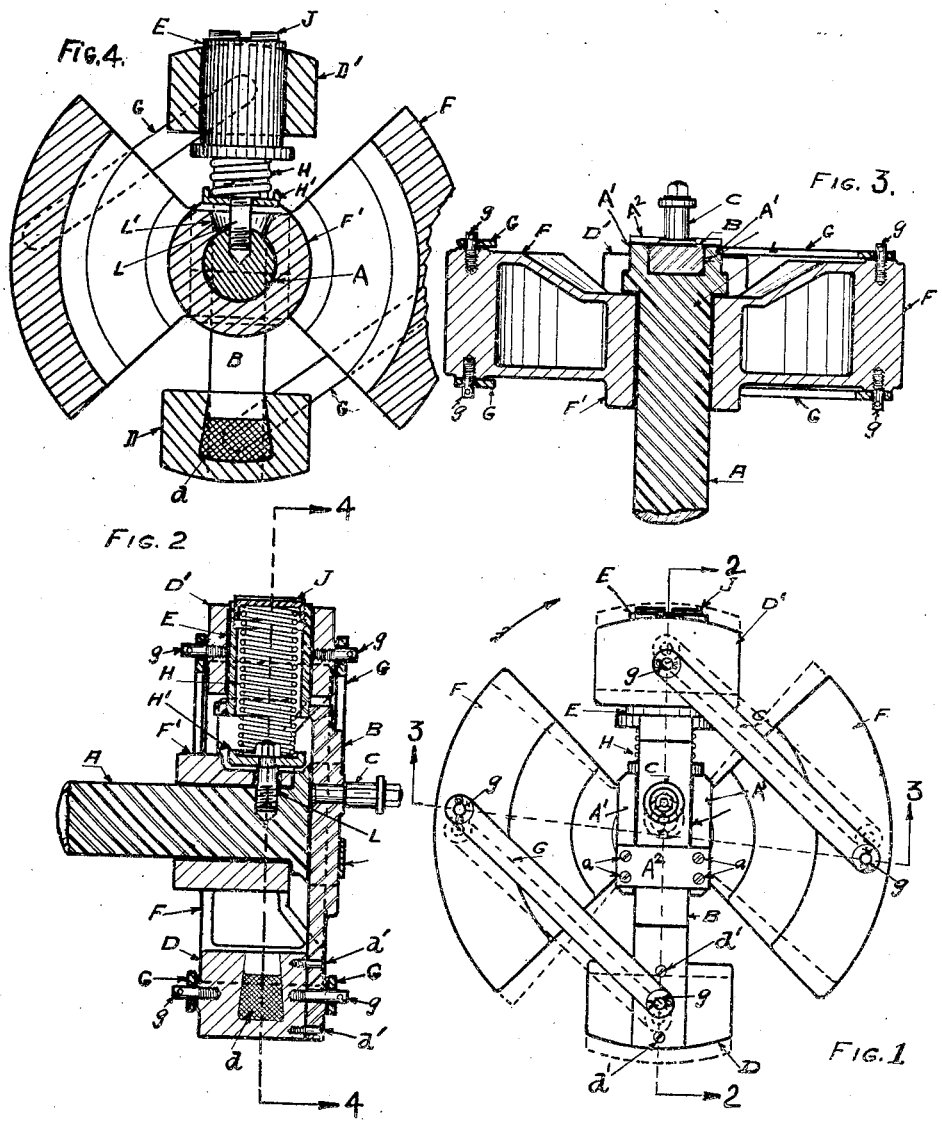
INVENTOR
Mark E. Smith
PER
ATTORNEYS

UNITED STATES PATENT OFFICE.

MARK E. SMITH, OF ERIE, PENNSYLVANIA.

CENTRIFUGAL GOVERNOR MECHANISM.

1,355,008.  Specification of Letters Patent.  Patented Oct. 5, 1920.

Application filed March 24, 1919. Serial No. 284,759.

*To all whom it may concern:*

Be it known that I, MARK E. SMITH, a citizen of the United States, residing at Erie, in the county of Erie and State of Pennsylvania, have invented certain new and useful Improvements in Centrifugal Governor Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to centrifugal governor mechanism having for its object the provision of certain novel features in combination, hereinafter described and claimed.

In the accompanying drawings:

Figure 1, is a front view in elevation of centrifugal governor mechanism embodying my invention.

Fig. 2, is a section of the same on the line 2—2 in Fig. 1.

Fig. 3, is a section of the same on the line 3—3 in Fig. 1.

Fig. 4, is a section on the line 4—4 in Fig. 2.

In these drawings A indicates a shaft having transverse guides A' on the end thereof, between which guides A' I place a slide bar B, which slide bar B is slidably secured in place by means of a plate A² secured to the guides A' by means of screws $a$, as shown in Fig. 1.

Upon one end of the bar B is secured a weight D by means of screws $d'$ or other suitable means; and on the opposite end of the slide bar B is secured a cylinder E. (See Fig. 2). The slide bar B is provided with the usual eccentric wrist pin C to which a valve rod of a steam engine (not shown) may be attached.

Rotatably mounted upon the shaft A is the hub F' of the inertia weights F, which hub F' is secured in its longitudinal position upon the shaft A by means of the tap bolt L which passes through the slotted opening L' (see Fig. 4) and is screwed into the shaft A as shown in Figs. 2 and 4.

Secured upon the tap bolt L is a seat plate H' upon which a spring H placed within the cylinder E may seat; said spring H being secured within the cylinder E by means of a closure cap J. Slidably mounted upon the cylinder E is a counter weight D', which counter weight D' is connected with one of the arms of the inertia weight F by means of links G which are pivoted upon the tap bolts $g$—$g$ in the counter weight D' and inertia weight F; and likewise links G are pivoted upon tap bolts $g$—$g$ in the opposite arm of the inertia weight F, and the weight D.

In operation when the governor is revolving, as indicated by the arrow in Fig. 1, and as the speed of the same increases, the weight D, and counter weight D' will move outwardly as indicated by broken lines in Fig. 1; the slide bar B and cylinder E moving in unison with the weight D thereby compressing the spring H within the cylinder E. This movement of the weights D and D' is communicated through the links G, to the inertia weights F, which are thereby caused to move backwardly as shown by broken lines thereof in Fig. 1.

When, however, the speed of the rotation of the shaft A and governor mechanism hereinbefore described, decreases, the spring H acts to draw the weight D toward the center of the shaft A, which through the links G force the inertia weights F ahead of the position thereof shown by full lines in Fig. 1. The return of the weights F and weights D and D' to their normal position as shown by full lines in Fig. 1, is therefore made gradual by the inertia of the weights F so that the action of the spring H will not suddenly force the weights D and D' back to their normal position, thereby steadying the action of the governor mechanism.

Having thus fully described the construction and operation of my invention, what I claim as new and desire to secure by Letters Patent is:

1. In a centrifugal governor mechanism, a shaft having a transverse slot in the end thereof, a bar slidably mounted in said slot, a weight on one end of said bar, a cylinder on the opposite end thereof, a spring within said cylinder and pressing against said shaft, an oscillating member mounted on said shaft, a link pivoted between an arm of said oscillating member and said weight, a counter weight slidably mounted on said cylinder, and a link pivoted between the other arm of said oscillating member and said slidable weight, substantially as set forth.

2. In a centrifugal governor mechanism a shaft having a transverse slot in the end thereof, a bar slidably mounted in said slot, a weight on one end of said bar, a cylinder secured on the opposite end of said bar, a hub mounted on said shaft adjacent to said slidable bar, radial weighted arms on said hub, said hub being provided with an elongated opening through the wall thereof, a tap bolt passing through said elongated opening and secured in said shaft, a seat plate secured on said tap bolt, a spring in said cylinder and pressing upon said seat plate to resist the centrifugal movement of said weight, a counter weight slidably mounted on said cylinder, links connecting said counter weight and one of said hub arms, and links connecting the opposite of said hub arms with the first mentioned weight, substantially as set forth.

In testimony whereof I affix my signature.

MARK E. SMITH.